United States Patent [19]
Becker

[11] Patent Number: 5,300,918
[45] Date of Patent: Apr. 5, 1994

[54] SHAFT ROTARY POSITION SENSOR

[75] Inventor: Manfred Becker, Frankenthal, Fed. Rep. of Germany

[73] Assignee: Deere & Company, Moline, Ill.

[21] Appl. No.: 14,302

[22] Filed: Feb. 4, 1993

[30] Foreign Application Priority Data

Mar. 6, 1992 [DE] Fed. Rep. of Germany ....... 4207064

[51] Int. Cl.$^5$ ..................... H01C 10/00; H01C 10/32
[52] U.S. Cl. ................................ 338/196; 338/162; 338/176; 338/DIG. 1
[58] Field of Search .......... 338/196, 162, 176, DIG. 1

[56] References Cited

U.S. PATENT DOCUMENTS

| | | | |
|---|---|---|---|
| 3,150,635 | 9/1964 | Root | 338/162 |
| 3,686,608 | 8/1972 | Wahlberg | 338/162 |
| 4,132,272 | 1/1979 | Holloway et al. | |
| 4,286,386 | 9/1981 | Long | 33/755 |
| 4,313,349 | 2/1982 | Heitman et al. | 74/507 |
| 4,343,365 | 8/1982 | Rajagopal et al. | |
| 4,846,283 | 7/1989 | Batcheller | 172/10 |
| 5,190,111 | 3/1993 | Young et al. | 172/7 |
| 5,231,892 | 8/1993 | Haight | 74/523 |

FOREIGN PATENT DOCUMENTS

| | | |
|---|---|---|
| 0153102 | 8/1985 | European Pat. Off. |
| 2724828 | 12/1978 | Fed. Rep. of Germany |
| 890055634 | 9/1990 | Japan |
| 81/02069 | 7/1981 | PCT Int'l Appl. |
| 2180699 | 4/1987 | United Kingdom |

OTHER PUBLICATIONS

Hindhede, U., "Machine Design Fundamentals, Chapter 13 Spur and Helical Gears", pp. 306 and 308, 1983.
J I Case, "Section 8009 Electronic Hitch Alignment", p. 8009-7, 1987.

*Primary Examiner*—Marvin M. Lateef

[57] ABSTRACT

A position sensor assembly for sensing the rotary position of a rockshaft of a hitch mechanism includes a rotary potentiometer coupled to the rockshaft. The rockshaft is enclosed in a rockshaft housing and a sensor housing is attached to the rockshaft housing. The potentiometer is attached to an outside surface of the sensor housing and has a sensor shaft which extends through a portion of the sensor housing. The position sensor has a first set of gear teeth on the rockshaft meshing with a second set of gear teeth on the sensor shaft. The sensor housing at least partially encloses the second set of gear teeth. The first and second sets of gear teeth are preferably configured as gear segments. The sensor shaft is supported for rotation by the sensor housing. The potentiometer is preferably a spring-pre-loaded potentiometer. A second spring is mounted on the second set of gear teeth and is engagable with a wall of the sensor housing to define an assembly position.

8 Claims, 3 Drawing Sheets

SHAFT ROTARY POSITION SENSOR

BACKGROUND OF THE INVENTION

The invention relates to a position sensor for sensing the rotational position of a shaft, in particular the rotational position of the rockshaft of the hitch mechanism of an agricultural tractor.

From U.S. Pat. No. 4,343,365, issued 10 August 1982 to Rajagopai et al., it is known to use a rotary potentiometer to sense the rotary position of the rockshaft of the hitch mechanism of an agricultural tractor. The output signal of such a position sensor may then be used as the actual position signal applied to an electronic controller. It would be desirable to provide such a position sensor which is reliable, simple to install and protected from dirt contamination.

SUMMARY OF THE INVENTION

Accordingly, an object of this invention is to provide a rotary potentiometer position sensor which operates reliably under rough operating conditions.

Another object of the invention is to provide such a position sensor which is capable of being manufactured at low cost and which can be easily installed.

These and other objects are achieved by the present invention, wherein a position sensor assembly for sensing the rotary position of a rockshaft of a hitch mechanism includes a rotary potentiometer coupled to the rockshaft. The rockshaft is enclosed in a rockshaft housing and a sensor housing is attached to the rockshaft housing. The potentiometer is attached to an outside surface of the sensor housing, and the potentiometer has a sensor shaft which extends through a portion of the sensor housing. The position sensor has a first set of gear teeth on the rockshaft meshing with a second set of gear teeth on the sensor shaft. The sensor housing at least partially encloses the second set of gear teeth. The first and second sets of gear teeth are preferably configured as gear segments. The sensor shaft is supported for rotation by the sensor housing. The potentiometer is preferably a spring-pre-loaded potentiometer. The rockshaft can be rotated from a first limit position to a second limit position, and a gear segment spring is mounted on the second set of gear teeth. The spring has an arm which is engagable with the sensor housing when the rockshaft is rotated to one of the limit positions. Preferably, the gear segment spring is at least twice as stiff as that of the potentiometer spring. The second gear segment is rigidly attached to the sensor shaft. The sensor housing is attached to a flange on the outside of the rockshaft housing. The sensor shaft transmits the rotational movement of the rockshaft to the potentiometer. As a result, the gearing can be completely sealed and isolated from the surrounding environment, thus preventing damage or the intrusion of dirt and dust.

This design provides an electrical position signal without transmission linkage and the resulting errors. The position sensor according to the invention can be manufactured simply and at low cost and is suitable for rough operating conditions. The second set of gear teeth can be arranged in a housing that can easily be mounted in the area of the first set of gear teeth.

DETAILED DESCRIPTION

Figure 1:
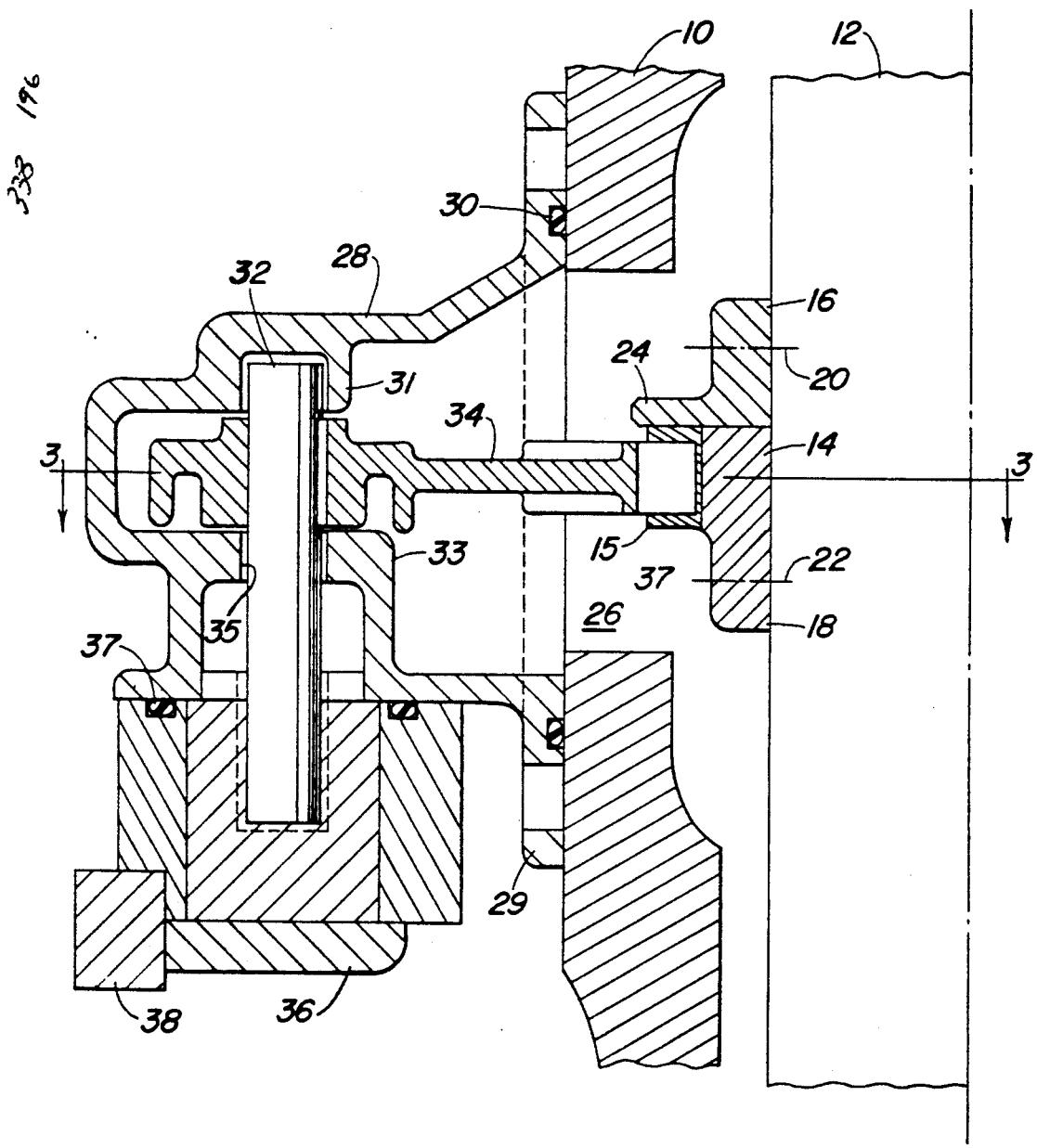
FIG. 1 shows a longitudinal section through a position sensor according to the invention.

A housing 10 encloses and rotatably supports a lift shaft or rockshaft 12 of a hitch mechanism (not shown) of an agricultural tractor (not shown). A first gear segment 14 with a set of teeth 15 is attached to the cylindrical surface of the shaft 12. Gear segment 14 is attached to shaft 12 by means of two mounting brackets 16, 18 which extend in the axial direction of the shaft 12 to either side of the teeth 15. The mounting brackets 16, 18 contain bores (not shown) which receive attaching bolts 20, 22. The teeth 15 are concentric to axis of the shaft 12. Gear segment 14 includes a reinforcing collar 24 on one side of the teeth 15 to assure the mechanical stability of the gear segment 14.

The shaft housing 10 contains an opening 26 in the area of the gear segment 14. Opening 26 is covered by a hermetically sealed sensor housing 28. The sensor housing 28 includes an attachment flange 29 which is sealingly attached to the shaft housing 10 by a seal ring 30.

The sensor housing 28 forms walls 31 and 33. Wall 31 has a cylindrical recess which rotatably receives an end of a sensor shaft 32. A bore 35 extends through wall 33 and rotatably receives sensor shaft 32. The sensor shaft 32 is rigidly connected by a key-way or spline connection to a second gear segment 34. The gear segment 34 includes a set of gear teeth 37 which extend through the opening 26 in the shaft housing 10 so as to mesh with the teeth 15 of the gear segment 14. The sets of gear teeth 15 and 37, the sensor housing 28 and the sensor shaft 32 may be manufactured from plastic.

An end of the sensor shaft 32 extends through bore 35 in wall 33 of housing 28 and into a conventional, commercially available rotary potentiometer 36, the housing of which is attached a side of the sensor housing 28 by bolts (not shown). A seal ring 37 is provided for sealing between the sensor housing 28 and the housing of the potentiometer 36. An electrical outlet 38 is provided in the potentiometer housing which contains contacts for electrical connections.

A rotational movement of the rockshaft 12 is transmitted via gear segment 14, gear segment 34 and the sensor shaft 32 to the potentiometer 36, which generates corresponding electrical signals. In order to insure good accessibility for the potentiometer 36, and, in particular, for the electrical connections of the potentiometer 36, the potentiometer shaft 32 is preferably extended through the sensor housing 28 and the potentiometer 36 is attached from the outside of housing 28. The potentiometer shaft 32 can be sealed with respect to the sensor housing 28. The result is an assembly which is sealed against contamination and damage.

Figure 3:
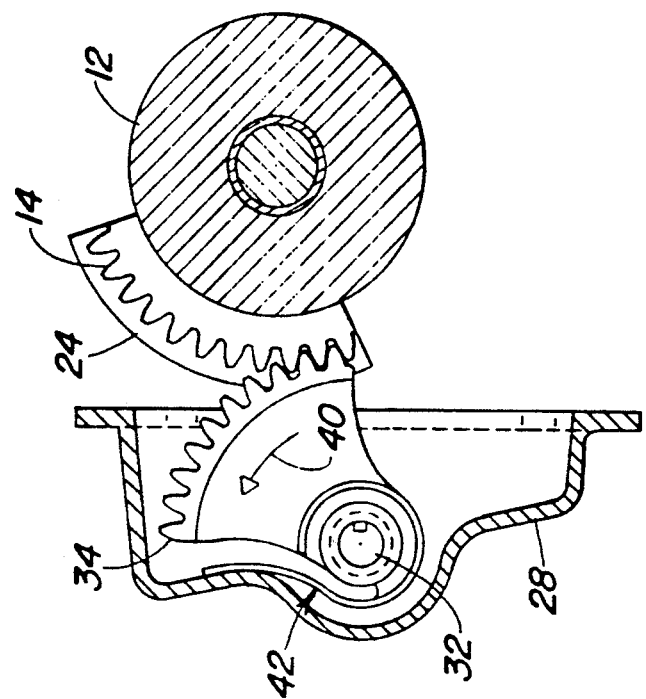
FIG. 3, 4 and 5 are cross sectional view along line A—A of FIG. 1 showing the present invention in various operating positions.
Figure 2:
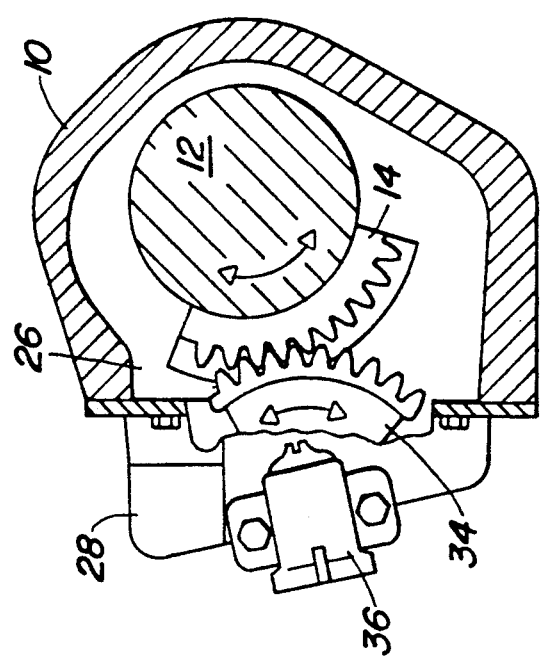
FIG. 2 shows a cross section through a shaft housing with a position sensor according to the invention attached by a flange, shown partially in section.

Preferably, the potentiometer 36 is a spring-loaded type and includes an internal spring (not shown) which urges the gear segment 34 in the direction of the arrow 40 of FIG. 3. The pre-load of the internal spring (not shown) of the potentiometer 36 eliminates the clearance or "free play" between the sets of gear teeth 15 and 37 which would otherwise cause a hysteresis in the sensing function. Sealed and spring-loaded potentiometers are commercially available, for example, the firm Duncan, U.S.A.

Figure 4:
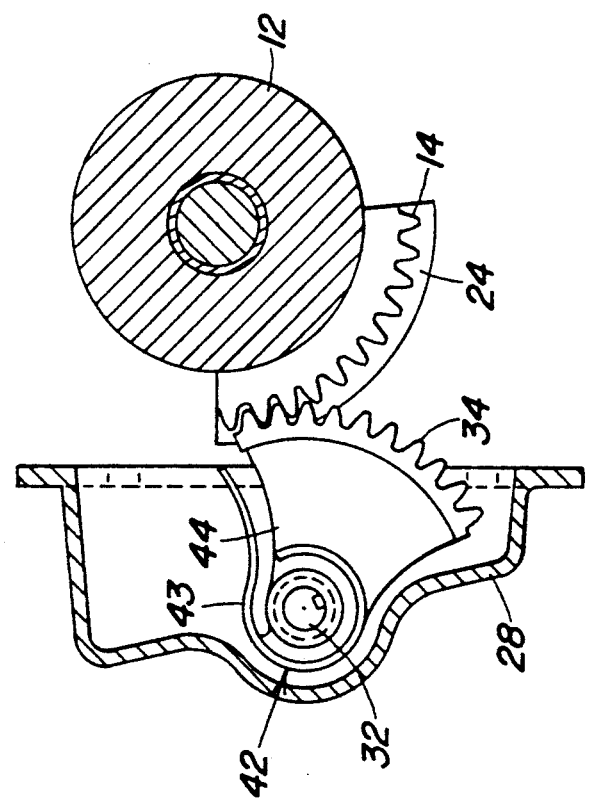

FIG. 3 shows the rockshaft 12 in a base position wherein the hitch (not shown) is fully lowered. FIG. 4 shows rockshaft 12 in a position corresponding to a fully raised position of the hitch (not shown). It can be seen that the side surfaces of the gear segment 34 will not come into contact with the inside wall of the sensor housing 28 in either the fully lowered or the fully raised positions. If the rockshaft 12 should rotate beyond the positions shown in FIGS. 3 and 4 due to unfavorable tolerance conditions, deflections or other movements, then the gear segment 34 can escape from meshing engagement with gear segment 14 without making contact with the sensor housing 28, so that damage to the teeth 15 and 37 can be avoided.

Figure 5:
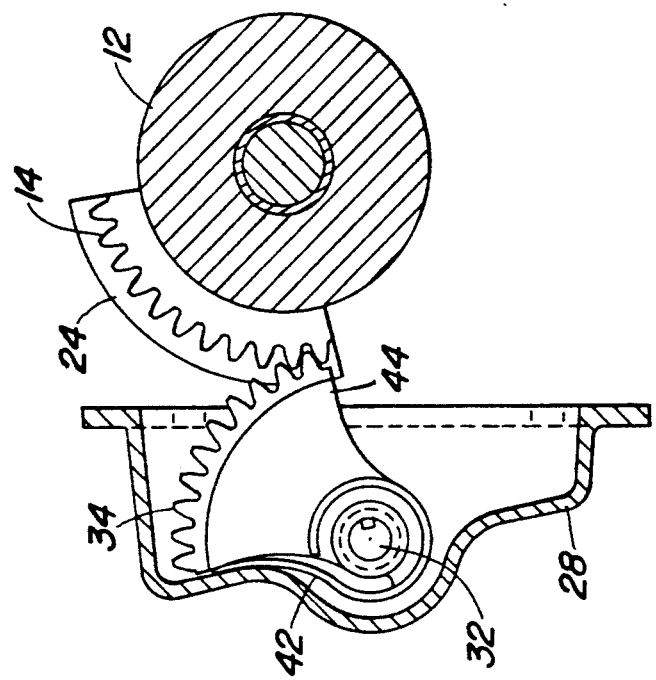

A spring 42 made of flat spring material is attached to the gear segment 34, and has an arm 43 which extends outwardly in a spiral manner. The arm 43 extends approximately parallel to and offset from a side surface 44 of the gear segment 34. In the fully lowered position of the shaft 12 and of the position sensor shown in FIG. 3, the spring 42 is in contact with the sensor housing 28. The position of the gear segment 34 shown in FIG. 3 is maintained due to the force of the potentiometer spring, even if the sensor housing 28 is not attached to the shaft housing 10. Before the sensor housing 28 is fastened to the shaft housing 10, the rockshaft 12 must be in the position shown (base or assembly position). To compensate for tolerances the gap between the second gear segment 34 and the sensor housing 28 can be reduced against the force of the flat spring 42, as is illustrated in FIG. 5. The spring 42 is preferably is at least twice as stiff as the stiffness of the potentiometer spring (not shown). As best seen in FIG. 3, when the rockshaft 12 is fully raised, the spring 42 is forced against the sensor housing 28 by the force of the potentiometer spring (not shown). If the rockshaft 12 is further rotated clock-wise to the position shown in FIG. 5, the spring 42 deflects. The interaction of the potentiometer spring (not shown) and the spring 42 defines an assembly position of the position sensor. Accordingly, a compensating adjustment during assembly can be eliminated.

In view of the low forces transmitted all components may be manufactured from plastic. Preferably the second set of gear teeth can be adjusted beyond the corresponding end positions of the rotational movement of the shaft. This design permits compensation for tolerances, whereby deflections and radial movement of the shaft (bearing clearance) can be absorbed without impairing the signal or damage or breakage of the gear.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. In an assembly including a rotatable main shaft enclosed in a main shaft housing, a position sensor assembly for sensing the rotary position of the main shaft, the assembly including a rotary potentiometer coupled to the main shaft, characterized by:
   a sensor housing attached to the main shaft housing; and
   the potentiometer is attached to an outside surface of the sensor housing, and the potentiometer having a sensor shaft which extends through a portion of the sensor housing and which is rotatably coupled to the main shaft.

2. The position sensor of claim 1 characterized by:
   a first set of gear teeth on the main shaft meshing with a second set of gear teeth on the sensor shaft, the sensor housing at least partially enclosing the second set of gear teeth.

3. The position sensor of claim 2, wherein:
   the first and second sets of gear teeth are configured as gear segments.

4. The position sensor of claim 1, wherein:
   the sensor shaft is supported for rotation by the sensor housing.

5. The position sensor of claims 1 wherein:
   the potentiometer is a spring-pre-loaded potentiometer.

6. The position sensor of claim 2, wherein:
   the sensor shaft can be rotated from a first limit position to a second limit position; and
   a gear segment spring is mounted on the second set of gear teeth, the spring having an arm which is engagable with the sensor housing when the sensor shaft is rotated one of the limit positions.

7. The position sensor of claim 6, wherein:
   the potentiometer is a spring-pre-loaded potentiometer; and
   the gear segment spring is at least twice as stiff as that of the potentiometer spring.

8. The position sensor of claim 6, wherein:
   the gear segment spring arrangement is configured as a flat spring which is attached to the second set of gear teeth and which extends approximately radially from a central portion of thereof.

* * * * *